United States Patent
Kim et al.

(10) Patent No.: US 9,648,570 B2
(45) Date of Patent: *May 9, 2017

(54) METHOD OF EFFICIENTLY REPORTING USER EQUIPMENT TRANSMISSION POWER AND APPARATUS THEREOF

(71) Applicant: Samsung Electronics Co., Ltd., Suwon-si, Gyeonggi-do (KR)

(72) Inventors: Sang Bum Kim, Seoul (KR); Soeng Hun Kim, Yongin-si (KR); Gert-Jan Van Lieshout, Staines (GB); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,721

(22) Filed: Jan. 22, 2015

(65) Prior Publication Data

US 2015/0133181 A1 May 14, 2015

Related U.S. Application Data

(63) Continuation of application No. 13/400,947, filed on Feb. 21, 2012, now Pat. No. 8,958,840.

(Continued)

(51) Int. Cl.
*H04B 7/00* (2006.01)
*H04W 52/36* (2009.01)
(Continued)

(52) U.S. Cl.
CPC ....... *H04W 52/365* (2013.01); *H04W 52/545* (2013.01); *H04W 72/0413* (2013.01);
(Continued)

(58) Field of Classification Search
CPC .................................................. H04W 52/365
(Continued)

(56) References Cited

U.S. PATENT DOCUMENTS 8,315,661 B2 * 11/2012 Zong ..................... H04W 52/16
455/226.1
8,917,643 B2 12/2014 Lee et al.
(Continued)

FOREIGN PATENT DOCUMENTS

CN 101932087 A 12/2010
CN 103119996 A 5/2013
(Continued)

OTHER PUBLICATIONS

U.S. Appl. No. 14/520,812 (Oct. 22, 2014); U.S. Appl. No. 14/632,341 (Feb. 26, 2015); U.S. Appl. No. 14/632,361 (Feb. 26, 2015) ; U.S. Appl. No. 14/638,535 (Mar. 4, 2015) ; U.S. Appl. No. 14/638,557 (Mar. 4, 2015); U.S. Appl. No. 14/664,270 (Mar. 20, 2015) ; U.S. Appl. No. 14/664,297 (Mar. 20, 2015).*

(Continued)

*Primary Examiner* — Sanh Phu
(74) *Attorney, Agent, or Firm* — Jefferson IP Law, LLP

(57) ABSTRACT

A method and an apparatus for efficiently transmitting or reporting a Power Headroom Report (PHR) of a User Equipment (UE) are provided. The method of transmitting the PHR of the UE in a mobile communication system includes configuring an extended PHR including an indicator corresponding to a variation factor of a maximum transmission power of the UE, and transmitting the extended PHR from the UE to a Base Station (BS). The BS may be notified of a maximum transmission power of the UE and a variation factor corresponding to the maximum transmission power in order to enable efficient scheduling.

16 Claims, 6 Drawing Sheets

Related U.S. Application Data

(60) Provisional application No. 61/444,844, filed on Feb. 21, 2011, provisional application No. 61/471,872, filed on Apr. 5, 2011.

(51) Int. Cl.
| | |
|---|---|
| *H04W 72/04* | (2009.01) |
| *H04W 52/54* | (2009.01) |
| *H04W 88/08* | (2009.01) |
| *H04W 88/06* | (2009.01) |
| *H04W 52/22* | (2009.01) |

(52) U.S. Cl.
CPC .......... *H04W 52/228* (2013.01); *H04W 88/06* (2013.01); *H04W 88/08* (2013.01); *Y02B 60/50* (2013.01)

(58) Field of Classification Search
USPC ............... 455/522, 67.11, 226.1, 63.1, 127.1
See application file for complete search history.

(56) References Cited

U.S. PATENT DOCUMENTS

| | | | |
|---|---|---|---|
| 8,958,840 B2* | 2/2015 | Kim | .............................. 370/318 |
| 2007/0019668 A1 | 1/2007 | Lee et al. | |
| 2009/0245191 A1 | 10/2009 | Ball et al. | |
| 2010/0316026 A1 | 12/2010 | Lee et al. | |
| 2011/0002284 A1 | 1/2011 | Talwar et al. | |
| 2012/0083310 A1 | 4/2012 | Zhao et al. | |
| 2012/0087317 A1 | 4/2012 | Bostrom et al. | |
| 2012/0224552 A1* | 9/2012 | Feuersanger | ......... H04L 5/0007 370/329 |
| 2013/0121203 A1 | 5/2013 | Jung et al. | |
| 2016/0081045 A1 | 3/2016 | Bostrom et al. | |

FOREIGN PATENT DOCUMENTS

| | | |
|---|---|---|
| CN | 103141041 A | 6/2013 |
| JP | 2011-508559 A | 3/2011 |
| JP | 2012-529841 A | 11/2012 |
| WO | 2010/065759 A2 | 6/2010 |
| WO | 2011/002789 A1 | 1/2011 |
| WO | 2012/108876 A1 | 8/2012 |

OTHER PUBLICATIONS

Alcatel-Lucent, "Introduction of new PHR trigger to indicate the configuredmaxinnum UE power variation", R2-106896, 3GPP TSG-RAN2, Dec. 19, 2010.
Ericsson et al., Adding a Power Management Indication in PHR, Change Request, 3GPP TSG-RAN2 Meeting #73, Taipei, Taiwan, Feb. 21-25, 2011, R2-110940.
Ericsson et al., Power Management Indication in PHR, 3GPP TSG-RAN WG2#73, Taipei, Taiwan, Feb. 21-25, 2011, Tdoc R2-110941.
3rd Generation Partnership Project; Technical Specification Group Radio Access Network; Evolved Universal Terrestrial Radio Access (E-UTRA); Radio Resource Control (RRC); Protocol Specification (Release 10), Dec. 2010, pp. 56, 59, 63, 159-161, and 238, 3GPP TS 36.331 V10.0.0.
InterDigital, PHR Triggering for SAR, 3GPP TSG RAN WG2 #72-bis, Dublin, Ireland, Jan. 17-21, 2011, R2-110220.
Qualcomm Incorporated, PHR Trigger for Power Reduction Due to Power Management, Change Request, 3GPP TSG-RAN2 Meeting #73, Taipei, Taiwan, Feb. 21-25, 2011, R2-110797.
Alcatel-Lucent; Introduction of new PHR trigger to indicate the configured maximum UE power variation; 3GPP TSG-RAN2 Meeting #72; R2-106896; Nov. 15-19, 2010; Jacksonville, FL.
Qualcomm Incorporated; Power Management Based PHR Trigger; 3GPP TSG-RAN2 Meeting #72bis; R2-110177; Jan. 17-21, 2011; Dublin, Ireland.
Nokia Siemens Networks et al.; PHR/P CMAX.c triggering and reporting; 3GPP TSG-RAN WG2 Meeting #72bis; R2-110378; Jan. 17-21, 2011; Dublin, Ireland.
Qualcomm Incorporated; Power Management Based PHR Trigger; 3GPP TSG-RAN2 Meeting #72bis; R2-110656; Jan. 17-21, 2011; Dublin, Ireland.
NTT Docomo, Inc.; P-MPR related PHR triggering condition; 3GPP TSG-RAN WG2 #73; R2-111245; Feb. 21-25, 2011; Taipei, Taiwan.
3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10. 0.0, Dec. 2010, URL: http://www.3gpp.org/ftp/Specs/archive/36_series/36.321/36321-a00.zip (document with the well-known feature; newly cited document).
3rd Generation Partnership Project; Technical Specification Group Radio Access Network; Evolved Universal Terrestrial Radio Access (EUTRA); Medium Access Control (MAC) protocol specification (Release10), 3GPP TS 36.321, V10.0.0, Dec. 17, 2010, pp. 1-53, XP050462124, Sophia-Antipolis, France.
Huawei et al, Consideration on DRX in eICIC scenario, 3GPP Draft, R2-111021 , Feb. 14, 2011, KP050493546, Taipei.
Alcatel-Lucent et al., RRC signalling design for Almost Blank Subframe patterns, 3GPP Draft, R2-106451, Nov. 9, 2010, XP050492280, Jacksonville, USA.
Research in Motion UK Limited, UE power saving for eICIC, 3GPP Draft, R2-111233, Feb. 15, 2011, KP050493735, Taipei, Taiwan.
ZTE, Clarification of Timing Requirements for Activation and Deactivation of SCells in TDD mode, 3GPP Draft, R4-110871, Feb. 16, 2011, XP050500940, Taipei.
Interdigital Communications, Report of Email discussion #26 on SCell Activation in LTE CA, 3GPP Draft, R2-111384, Feb. 18, 2011, XP050605673, Taipei, Taiwan.
3rd Generation Partnership Project; Technical Specification Group Radio Access Network; Evolved Universal Terrestrial Radio Access (E-UTRA); Physical layer procedures (Release 10), 3GPP TS 36.213, V10.0.1, Dec. 28, 2010, pp. 1-98, XP050462385, Sophia-Antipolis, France.
E-mail rapporteur (NTT DOCOMO, INC.), CA support for multi-TA, 3GPP TSG-RAN2#69, R2-101567, Feb. 2010, San Francisco, U.S.A.
Samsung, CSI reporting and SRS timing upon SCell activation/deactivation, 3GPP TSG-RAN1#63bis, R1-110069, Dublin, Ireland, Jan. 21, 2011.
3GPP TS 36.321 V10.1.0, Medium Access Control (MAC) protocol specification (Release 10), Mar. 31, 2011, Sophia Antipolis, France.

* cited by examiner # METHOD OF EFFICIENTLY REPORTING USER EQUIPMENT TRANSMISSION POWER AND APPARATUS THEREOF

PRIORITY

This application is a continuation application of a prior application Ser. No. 13/400,947, filed on Feb. 21, 2012, which claimed the benefit under 35 U.S.C. §119(e) of a U.S. Provisional application filed on Feb. 21, 2011 in the U.S. Patent and Trademark Office and assigned Ser. No. 61/444,844, and of a U.S. Provisional application filed on Apr. 5, 2011 in the U.S. Patent and Trademark Office and assigned Ser. No. 61/471,872, the entire disclosure of each of which is hereby incorporated by reference.

BACKGROUND OF THE INVENTION

1. Field of the Invention

The present invention relates to a method of efficiently reporting User Equipment (UE) transmission power and an apparatus thereof. More particularly, the present invention relates to a method of reporting UE transmission power including a variation factor of maximum transmission power of a UE, and an apparatus thereof.

2. Description of the Related Art

In general, mobile communication systems have been developed to provide communication while providing mobility to a user. Research and development of mobile communication systems has resulted in mobile communication systems capable of providing high speed data communication services as well as voice communication services with dramatic development of corresponding technology.

In recent years, research and development of standards with respect to Long Term Evolution (LTE) technology by the 3$^{rd}$ Generation Partnership Project (3GPP) as one of next generation mobile communication systems has occurred. LTE is a technology implementing high speed packet based communication having a maximum transmission rate of approximately 100 Mbps. In order to achieve this transmission rate for LTE technology, various approaches have been discussed. For example, an approach of simplifying a construction or structure of a network in order to reduce a number of nodes located along a communication line or an approach for approximating wireless protocols with respect to a wireless channel have been discussed.

Meanwhile, from among an amount of bandwidth, a resource to be allotted to a data service is determined according to an amount of data to be transmitted and a channel condition, unlike a voice service. Accordingly, management operations allotting a transmission resource consider an amount of resources available in a wireless communication system, such as a mobile communication system. These management operations are performed in LTE systems, which are considered to be one of the next generation mobile communication systems, and a scheduler located at a base station of the LTE network manages and allots a wireless transmission resource.

LTE-Advanced (LTE-A) communication systems providing improved transmission speeds by combining various new techniques with an LTE communication system has been actively researched and discussed. Among the various new techniques, carrier aggregation is a representative example of newly introduced technologies. Unlike the related art where a UE performs data transmission and/or reception using one forward carrier and one reverse carrier, according to carrier aggregation, one UE may use a plurality of forward carriers and a plurality of reverse carriers in the carrier aggregation. Accordingly, unlike the related art, it is necessary to efficiently set UE transmission power for a plurality of reverse carriers. To do this, a UE should report the UE's maximum transmission power and available power.

Research and development of LTE communication systems allows for one UE to perform a dual mode function using a plurality of system modems. Furthermore, the UE may receive provisioning of separate services using different systems and the corresponding system modems of the UE. Thus, a UE should report a maximum transmission power and available power used corresponding to each system used by the UE for scheduling.

SUMMARY OF THE INVENTION

Aspects of the present invention are to address at least the above-mentioned problems and/or disadvantages and to provide at least the advantages described below. Accordingly, an aspect of the present invention is to provide a method that may include a variation factor of maximum transmission power of a User Equipment (UE) in a transmission power report and an apparatus thereof.

Another aspect of the present invention is to provide a method capable of reporting whether a various factor of maximum transmission power of a UE is a Power management-Maximum Power Reduction (P-MPR).

In accordance with an aspect of the present invention, a method of transmitting a Power Headroom Report (PHR) of a UE in a mobile communication system is provided. The method includes configuring an extended PHR including an indicator corresponding to a variation factor of a maximum transmission power of the UE, and transmitting the extended PHR from the UE to a Base Station (BS).

In accordance with another aspect of the present invention, a method of receiving a PHR at a BS in a mobile communication system is provided. The method includes transmitting control information indicating applicability of an extended PHR including an indicator corresponding to a variation factor of a maximum transmission power of a UE to the UE, and receiving the extended PHR from the UE.

In accordance with another aspect of the present invention, an apparatus for transmitting a PHR of a UE in a mobile communication system is provided. The apparatus includes a controller for configuring an extended PHR including an indicator corresponding to a variation factor of a maximum transmission power of the UE, and a transceiver for transmitting the extended PHR to a BS.

In accordance with another aspect of the present invention, an apparatus for receiving a PHR of a BS in a mobile communication system is provided. The apparatus includes a controller for generating control information indicating applicability of an extended PHR including an indicator corresponding to a variation factor of a maximum transmission power of a UE, and a transceiver for transmitting the control information and receiving the extended PHR from the UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a Long Term Evolution (LTE) system, transmission power available for use by a User Equipment (UE) is referred to as a Power Headroom (PH), which may also be referred to as a PH value, which is defined as a difference between the UE's maximum transmission power $P_{CMAX}$ and an amount of the UE's transmission power currently being used by the UE. If certain conditions are met, the UE reports the PH value to a base station via a Power Headroom Report (PHR). In the related art, certain conditions for reporting the PHR by the UE include when conditions of a wireless path are changed by a value greater than a predetermined threshold value, or when a PH report period comes, i.e., a predetermined PHR transmission interval occurs. A Base Station (BS), such as an evolved NodeB (eNB), may anticipate a channel state used by a corresponding UE based on collected PH values, and determine whether to allot additional wireless resources to a corresponding UE. Herein, the terms BS and eNB may be used interchangeably. The PH continuously changes due to several factors, including variation of the UE's maximum transmission power $P_{CMAX}$, variation of wireless path loss, or a Transmitter Power Control (TPC) command error. Due to this, the BS may incorrectly or improperly allot wireless resources.

Figure 1A:
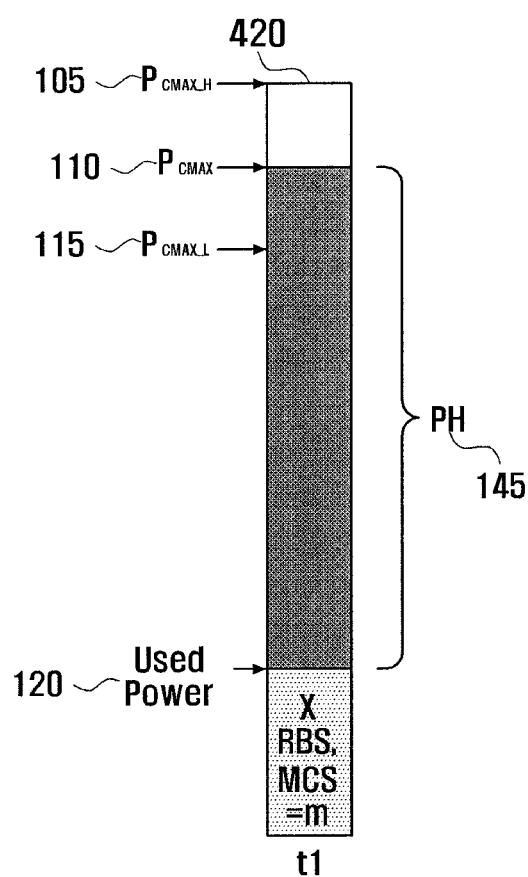
FIGS. 1A and 1B are diagrams illustrating a case where an evolved NodeB (eNB) performs undesirable scheduling according to an exemplary embodiment of the present invention.
Figure 1B:
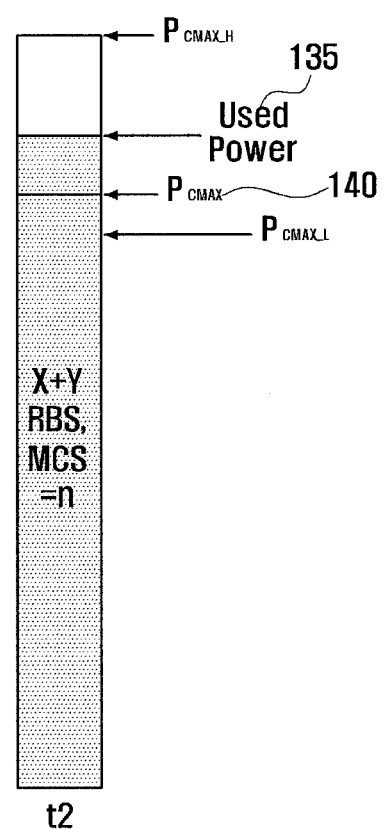

FIGS. 1A and 1B are views illustrating a case where a eNB performs undesirable scheduling according to an exemplary embodiment of the present invention.

Referring to FIG. 1A, a UE power use rate at a time t1 is illustrated. A maximum power value $P_{CMAX\_H}$ 105 and a minimum power value $P_{CMAX\_L}$ 115 of the UE's maximum transmission power $P_{CMAX}$ 110 are determined using a parameter provided by an eNB and previously defined parameters, such as a power range, so as to respectively be one value within the range.

At the time t1, the UE receives an allotment of X wireless resources of a Resource Block (RB) and transmits data using a Modulation and Coding Scheme (MCS) having a rate of m. In this case, a UE's used transmission power 120 is less than the UE's maximum transmission power $P_{CMAX}$ 110. If certain conditions are met, the UE transfers a PH 145, i.e., a PH value, corresponding to a difference between the maximum transmission power $P_{CMAX}$ 110 and the used transmission power 120 as a PHR to an eNB.

Although more wireless resources may be allotted to the UE based on the PH value, the eNB may also determine that the UE's transmission power is not lacking. Accordingly, the eNB further allots Y RBs, and increases the MCS to a rate of n, which is higher than the previous rate of m, so as to provide a service with a higher transmission rate.

FIG. 1B illustrates a UE power use rate at a time t2. As illustrated in FIG. 1B, an amount of used transmission power 135 is increased as compared to the used transmission power 120 of FIG. 1A, but a maximum transmission power $P_{CMAX}$ 140 is reduced so as to not influence the used transmission power 135. Accordingly, the maximum transmission power $P_{CMAX}$ 140 varies due to an amount and a location of a Physical Resource Block (PRB), or a RB, a bandwidth of a system, a frequency band, and a number of scheduled carriers.

Accordingly, according to the present exemplary embodiment, a UE reports a maximum transmission power $P_{CMAX}$, and a eNB collects the information, and considers and calculates the UE's maximum transmission power $P_{CMAX}$ which is changed according to a plurality of situations. However, it is not sufficient to only collect the UE's maximum transmission power $P_{CMAX}$. Thus, the eNB should additionally know or determine what factors may cause or influence the UE's maximum transmission power $P_{CMAX}$ to be changed in order to have more meaningful information.

In order to determine the factors influencing the UE's maximum transmission power $P_{CMAX}$, a reference value or parameter used for determining the UE's maximum transmission power $P_{CMAX}$ should be acquired. As discussed above, a maximum power value $P_{CMAX\_H}$ and a minimum power value $P_{CMAX\_L}$ of the UE's maximum transmission power $P_{CMAX}$ are determined using a parameter provided from an eNB and previously defined parameters, such as a power range, such that the above noted power values are determined to respectively be one value within the range.

That is, according to Equation 1, as shown below, $$P_{CMAX\_L} \leq P_{CMAX} \leq P_{CMAX\_H} \quad \text{Equation 1}$$

where, the maximum power value $P_{CMAX\_H}$ and the minimum power value $P_{CMAX\_L}$ are defined using following Equation 2 and Equation 3.

$$P_{CMAX\_L} \leq \text{MIN}\{P_{CMAX} - \Delta Tc, P_{PowerClass} - \text{MAX}(\text{MPR} + A\text{-MPR}, P\text{-MPR}) - \Delta Tc\} \quad \text{Equation 2}$$

$$P_{CMAX\_H} = \text{MIN}\{P_{EMAX}, P_{PowerClass}\} \quad \text{Equation 3}$$

$P_{CMAX}$ is maximum transmission power provided from the eNB, and the information or value of $P_{CMAX}$ may be provided or transmitted to the UE through a System Information Block Type 1 (SIB 1) message that includes broadcast information, or through any other similar or suitable information transmission method. Meanwhile, $P_{PowerClass}$ is a maximum transmission power which each UE may respectively provide. $P_{CMAX\_H}$ is defined as a minimum power value of the $P_{CMAX}$ and the $P_{PowerClass}$.

The $P_{CMAX\_L}$ is influenced by the values of a Maximum Power Reduction (MPR), an Additional-MPR A-MPR and a P-MPR, wherein $\Delta Tc$, MPR, and A-MPR are parameters defining a limit value to which a UE may adjust the maximum transmission power $P_{CMAX}$ so as to match the limit value in a serving cell with respect to an adjacent channel having predetermined conditions affecting transmission power of the serving cell.

The MPR may be determined according to an amount of bandwidth and a modulation scheme that the UE is allotted. However, the present invention is not limited thereto, and other factors may be used to determine the MPR. The A-MPR may be determined according to several factors, including a frequency band in which a reverse transmission occurs, local characteristics of a channel or a cell, and a bandwidth of a reverse transmission. When a frequency band is sensitive to or effected by spurious radiation at a periphery of the frequency band, the A-MPR is determined according to the local characteristics of the channel or the cell and frequency band characteristics. When reverse transmission is performed using a channel or a frequency located at an edge of a frequency band, $\Delta Tc$ is used to allow for an additional transmission power adjustment. When the reverse transmission is performed at a frequency band corresponding to a bottom or lower 4 MHz of an operational frequency band or a at a frequency band corresponding to a top or upper 4 MHz, then the UE may set $\Delta Tc$ to 1.5 dB. However, the present invention is not limited thereto, and the in other cases, the UE sets $\Delta Tc$ to 0, or any other suitable value.

The P-MPR is a value by which a transmission output may be reduced according to Specific Absorption Rate (SAR) conditions in order to control an influence of an electromagnetic wave on a human body, and may be determined according to a distance between a device, such as the UE, and the human body. For example, when a distance between the device and the human body is small, i.e., the device is near to the human body, a total transmission power output value of the device should be reduced. In order to reduce the total transmission power output value of the device, the P-MRP is set to be a high value. On the other hand, when the distance between the device and the human body is large, i.e., the device is far from the human body, the total transmission output value of the device may be increased, and the P-MPR is set to be a small or low value.

As shown in Equation 2, the P-MRP is related to power management operations of the UE. For example, when a plurality of carriers are simultaneously operated or, in other words, the UE transmits data using more than one system modem, the P-MRP is used to limit the maximum power allotted to one carrier or one system. Accordingly, it will be understood that, in the present exemplary embodiment, the UE's maximum transmission power $P_{CMAX}$ is changed according to two factors including the sum of MPR+A-MPR, which is associated with out-of-band emission requirements and a P-MPR that is associated with power management.

According to the present exemplary embodiment, the UE may report an indicator, variable, or piece of information from which it is possible to determine the applicability of the above two factors, together with a maximum transmission power. An eNB, according to the reported indicator, may determine how the UE's maximum transmission power $P_{CMAX}$ is to be changed according to various situations or conditions in which the UE is attempting to transmit. In the present exemplary embodiment, a method of transferring a one bit indicator indicating a variation cause of the UE's maximum transmission power $P_{CMAX}$ and maximum transmission power may be used. However, the present invention is not limited thereto, and the indicator may be transmitted as a multi-bit indicator, or may be transmitted by any other suitable means. The one bit indictor is called a p-bit according to the present exemplary embodiment. A bit value of '0' for the p-bit indicates a case where the maximum transmission power is not influenced by a P-MPR for power management, and a bit value of '1' for the p-bit indicates a case where the maximum transmission power is influenced by the P-MPR for power management.

That is, in the case where the P-MPR is applied and the $P_{CMAX}$ has a different value, then the p-bit is set to a bit value of 1. In a case where the P-MPR is not applied, if the $P_{CMAX}$ value is the same, then the p-bit is set to a bit value of 0. In order to transmit the p-bit in the PHR, an enlarged or extended PHR format may be used to include additional information, wherein the extended PHR is larger than a related-art PHR. In addition to PHR trigger conditions of the related-art, according the present exemplary embodiment, when the P-MPR is changed by a value greater than a predetermined threshold, the PHR is triggered.

Figure 2:
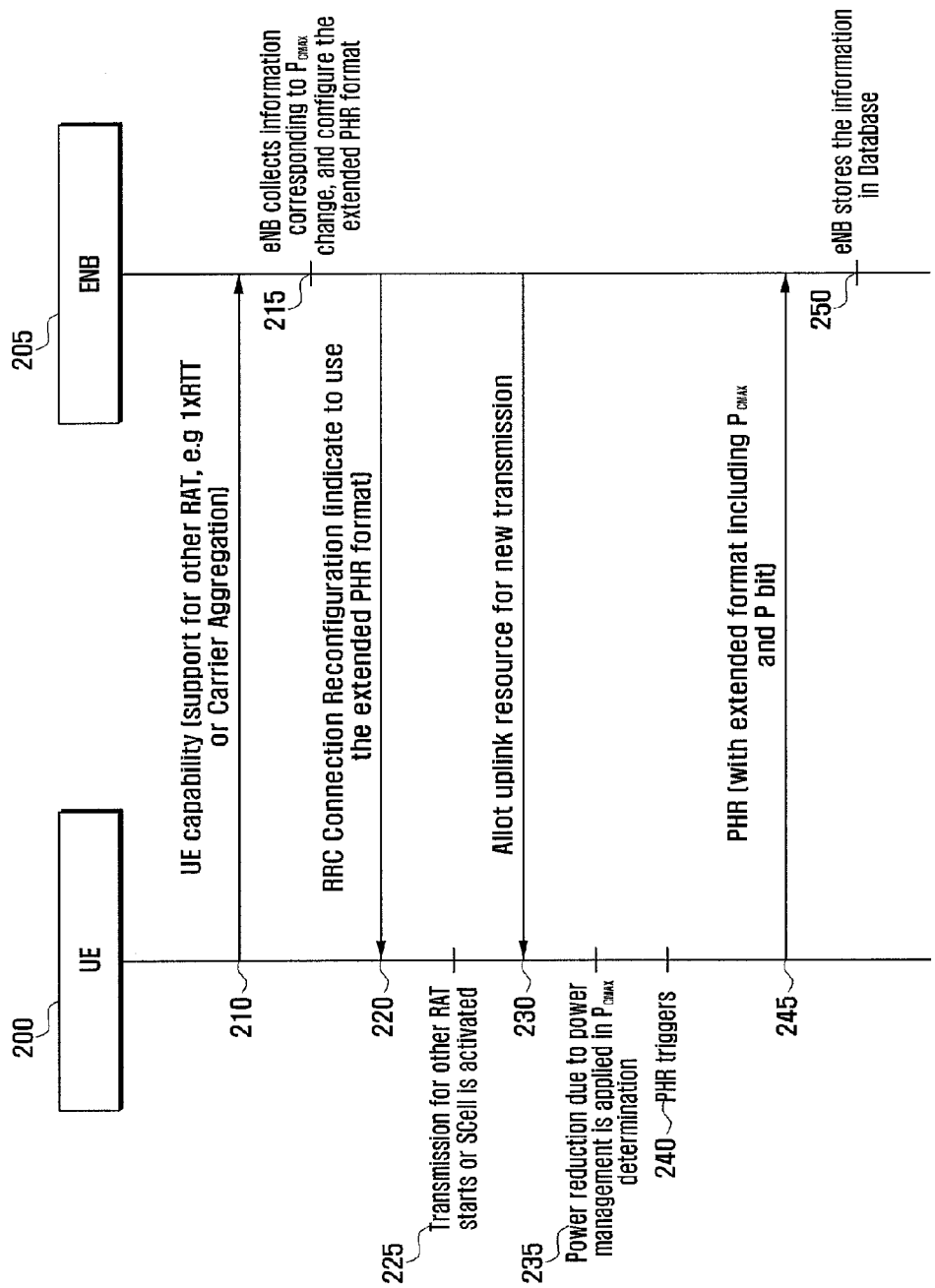
FIG. 2 is a diagram illustrating a procedure of transmitting and receiving a Power Headroom Report (PHR) according to an exemplary embodiment of the present invention.

FIG. 2 is a diagram illustrating a procedure of transmitting and receiving a PHR according to an exemplary embodiment of the present invention.

Referring to FIG. 2, a UE 200 informs a base station, such as an eNB 205, that the UE 200 may support another Radio Access Technology (RAT) or may perform Carrier Aggregation (CA) in step 210. Then, in step 215, the eNB 205 collects information corresponding to the $P_{CMAX}$ variation for various situations of the UE, and determines use of and configures the extended PHR format.

Next, the eNB 205 indicates use of the extended PHR format to the UE 200 through a Radio Resource Control (RRC) Connection Reconfiguration message transmitted to the UE 200 in step 220. For example, the use of or application of the extended PHR format may be indicated through a Media Access Control (MAC)—MainConfig Information Element (IE) or other PHR relation setting information that is included in the PHR-config IE. In step 225, the UE transmits data through another RAT or recognizes that data transmission should occur using a plurality of serving cells, namely, an additional Secondary Cell (Scell) using a CA technology.

Next, the eNB 205 allots an uplink resource for a new transmission to the UE 200 in step 230. In step 235, when determining the $P_{CMAX}$, the UE 200 determines that the $P_{CMAX}$ is influenced by the P-MPR for power management, or in other words, the UE 200 determines that a power reduction due to the P-MPR for power management is applicable to the $P_{CMAX}$ determination. The UE 200 selects a $P_{CMAX}$ that is within a range of a maximum value $P_{CMAX\_H}$ and a minimum value $P_{CMAX\_L}$ obtained from Equations 2 and 3, as discussed above. Next, in step 240, it is determined if at least one of following conditions is satisfied in order for the UE to trigger the PHR.

Condition 1: when a wireless path loss value in a downlink is changed by an amount greater than a threshold value dl-PathlossChange provided from at least one serving cell to an eNB, such as the eNB 205, in a state where a prohibit-PHR-Timer is expired.

Condition 2: when a periodic-PHR-Timer is expired.

Condition 3: when a PHR is for configuration and/or reconfiguration according to a request from an upper layer.

Condition 4: when one SCell is activated together with an uplink cell.

Condition 5: when power reverseoff by P-MPR is changed by greater than a threshold dl-PathlossChange.

Next, in step 245, if one of the Conditions 1 through 5 is satisfied, then the UE 200 reports, i.e., transmits, an extended PHR to the eNB 205. The extended PHR contains a 1 bit indicator, i.e., the p-bit, for informing of the presence of influences of the $P_{CMAX}$ and the P-MPR together with PH information, i.e., the PH value, in the PHR. When a maximum transmission power is not influenced by the P-MPR for power management, then the p-bit is set to a bit value of '0', and when the maximum transmission power is influenced by the P-MPR for power management, then the p-bit is set to a bit value of '1'.

For reference, when CA is applied, the extended PHR includes the PH value, the $P_{CMAX}$, and the p-bit value corresponding to all activated SCells. Here, the PH is calculated by a following Equation 4.

$$PH(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}$$
Equation 4

An i-th subframe PH(i) in a serving cell c is calculated according to a maximum reverse transmission power $P_{CMAX,c}(i)$, a number of resource blocks $M_{PUSCH,c}(i)$ for a Physical Uplink Shared Channel (PUSCH), a power offset $\Delta_{TF,c}$ induced from the MCS, a path loss $PL_c$, and a number of accumulated TPC commands $f_c(i)$.

The $PL_c$ of Equation 4 is a path loss value of a serving cell c. Furthermore, a path loss value used to determine a reverse transmission output of an optional serving cell is a path loss value of a forward channel of a corresponding cell or a path loss value of a forward channel of another cell. The eNB may determine and inform the UE in a call setting procedure to use any path.

In Equation 4, the $f_c(i)$ is a value corresponding to the number of accumulated TPC commands of a serving cell c. $P_{O\_PUSCH,C}$ is a parameter in an upper layer and is a sum of cell-specific and UE-specific resource blocks. In general, different values are applied to the $P_{O\_PUSCH,C}$ according to PUSCH transmission types, such as semi-persistent scheduling, dynamic scheduling, and random access response.

The value $\alpha_c$ is 3-bit cell-specific value provided in an upper layer. When a reverse transmission output power is calculated, $\alpha_c$ is a weight applied to path loss, wherein the higher a weight applied to a path loss is, the greater the influence on the reverse transmission output power, and an applicable value is limited to $\alpha_c$ according to a type of PUSCH transmission. Additionally, in Equation 4, a j value is used to indicate a type of PUSCH, wherein j=0 indicates semi-persistent scheduling, j=1 indicates dynamic scheduling, and j=2 indicates random access response.

Next, the eNB 205 stores the information included in the received PHR in a database, and uses such information for scheduling in step 250.

Figure 3A:
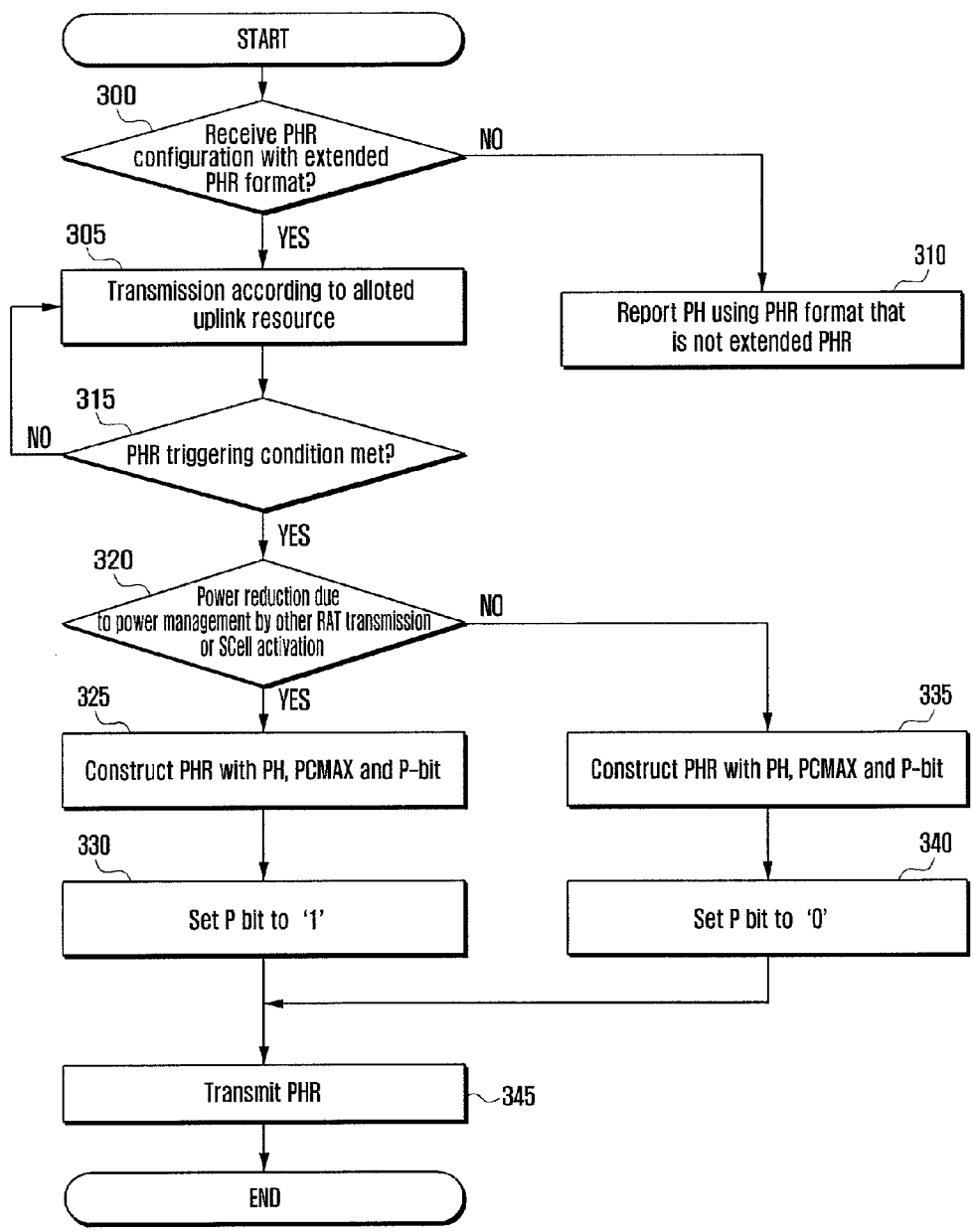
FIG. 3A is a flowchart illustrating a method of transmitting a PHR by a User Equipment (UE) according to an exemplary embodiment of the present invention.

FIG. 3A is a flowchart illustrating a method of transmitting a PHR by a UE according to an exemplary embodiment of the present invention.

Referring to FIG. 3A, in step 300, a UE determines whether there is an instruction to apply an extended PHR format among PHR setting information received from the eNB. If it is determined by the UE that there is no such instruction, then the UE reports the PH using a PHR format other than the extended PHR format of the present exemplary embodiments of the present invention in step 310.

If it is determined by the UE that there is an instruction to apply the extended PHR format, then, in step 305, the UE transmits data according to allotment of an uplink resource, and continuously determines whether any of the PHR trigger conditions are met in step 315. If at least one of the PHR trigger conditions is met, then in step 320, the UE determines whether a $P_{CMAX}$ value to be reported in the PHR is influenced by the P-MPR in a power management side. In other words, in step 320, the UE determines whether a power reduction due to power management by another RAT's transmission or SCell activation influences the $P_{CMAX}$ value.

Next, if the $P_{CMAX}$ value is influenced by the P-MPR, the UE configures an extended PHR in step 325, and sets a p-bit value to '1' in step 330. However, if the $P_{CMAX}$ value is not influenced by the P-MPR, then the UE configures an extended PHR in step 335, and sets the p-bit value to '0' in step 340. Next, in step 345, the UE reports the PHR to the eNB.

Figure 3B:
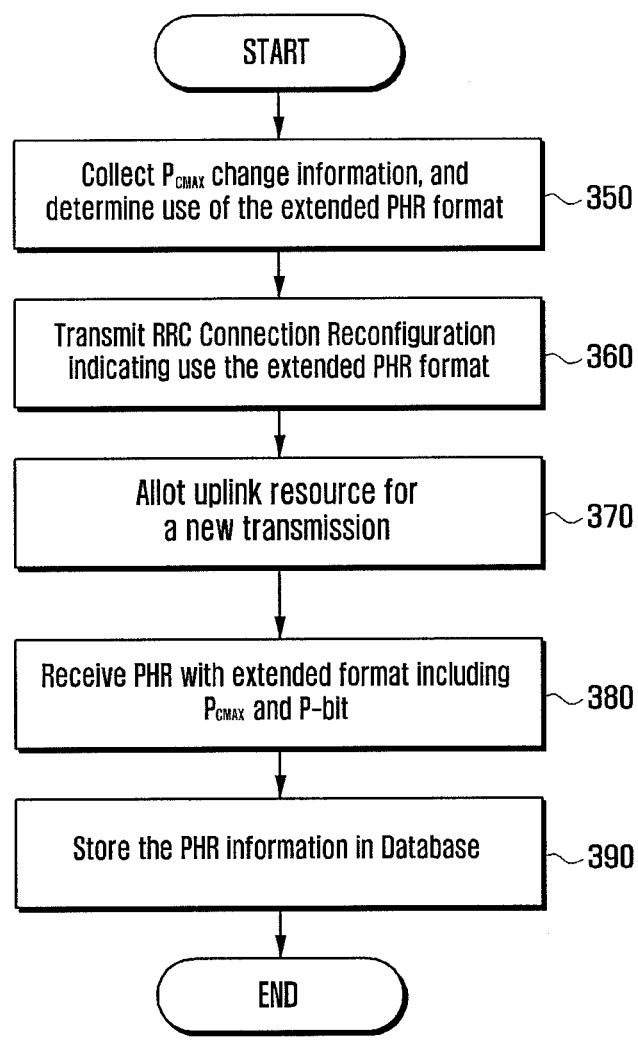
FIG. 3B is a flowchart illustrating a method of receiving a PHR by an eNB according to an exemplary embodiment of the present invention.

FIG. 3B is a flowchart illustrating a method of receiving a PHR by an eNB according to an exemplary embodiment of the present invention.

Referring to FIG. 3B, in step 350, an eNB collects information corresponding to a $P_{CMAX}$ variation for various situations of a UE and determines whether to use an extended PHR format according to the exemplary embodiments of the present invention.

Next, the eNB instructs the UE to use the extended PHR format by transmitting an RRC Connection Reconfiguration message indicating use of the extended PHR format. The use of the extended PHR format may be indicated through the MAC-MainConfig IE, and the PHR relation setting information that is included in the PHR-config IE. Next, the eNB allots an uplink resource for a new transmission to the UE in step 370.

The eNB receives an extended PHR from the UE in step 380. As discussed above, the extended PHR includes a 1 bit indicator, that is the p-bit, for informing the eNB of the presence of influence of $P_{CMAX}$ and P-MPR, as well as the PH information. If a maximum transmission power is not influenced by the P-MPR for power management, then p-bit is set to a bit value of '0', and if the maximum transmission power is influenced by the P-MPR for power management, then the p-bit is set to a bit value of '1'. For reference, when CA is applied, the evolved PHR includes the PH value, the $P_{CMAX}$, and the p-bit value of all activated SCells. Next, the eNB stores information corresponding to the PHR in a database so as to be used for scheduling in step 390.

Figure 4:
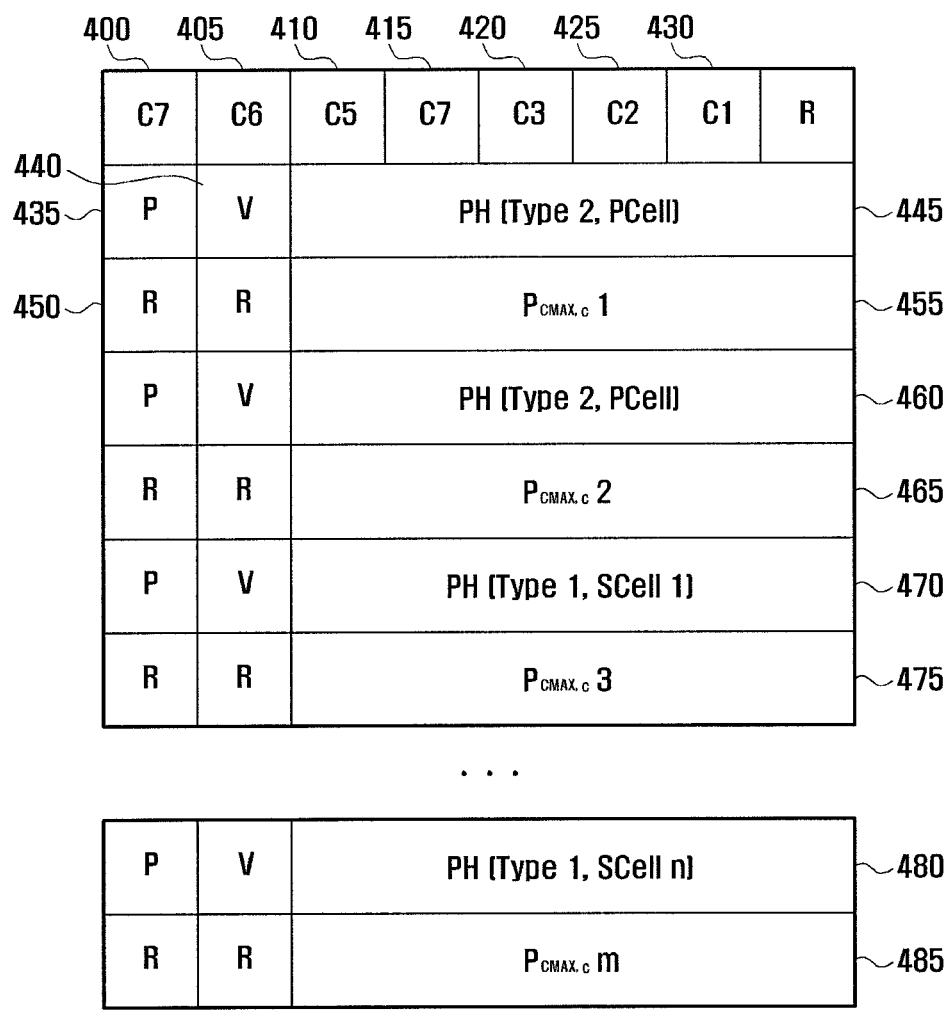
FIG. 4 is a diagram illustrating a format of an extended PHR according to an exemplary embodiment of the present invention.

FIG. 4 is a diagram illustrating a format of an extended PHR according to an exemplary embodiment of the present invention.

When a PH or a plurality of PH values of a plurality of serving cells is reported in a mobile communication system in which a plurality of carriers are integrated or aggregated, the plurality of PH values are collected so as to be transmitted in one PHR. Such a method of transmitting a PHR including collected PH values may reduce a signal overhead in comparison with transmission of each PH value by respective carriers, and also allows for transmission of PH values corresponding to carriers in which there is no actual PUSCH transmission for a PHR.

Referring to FIG. 4, blocks 400 to 430 are a series of 7 bits, C1 to C7, that form a bitmap for instructing whether a PH value of a respected activated Component Carrier (CC) is included in a corresponding PHR. Each of the bits C1 to C7 of the bitmap corresponds to a respective SCell index, and, thus, corresponds to one SCell.

Block 435 is a p-bit for indicating whether a terminal's or a UE's maximum transmission power $P_{CMAX}$ is influenced by a P-MRP, as discussed above with reference to FIGS. 3A and 3B.

In a case where there is no actual PUSCH transmission, the eNB may trigger a PHR in order to obtain path loss information for a specific reverse carrier. Furthermore, when there is no PUSCH transmission, the UE and the eNB may determine a transmission format, with respect to a MCS level of transmission resource, to be used in order to calculate a PH value. In such a case, the eNB should be notified as to whether a PH value of each serving cell is included in the PHR that is calculated and transmitted with respect to an actual PUSCH transmission or whether the PHR format is transmitted using a previously defined format that does not include a PH value of each serving cell. To do this, a V-bit is transmitted in block 440 as an indicator for whether a PH value of each serving cell is included in the transmitted PHR.

With respect to setting a value of the V-bit of block 440, when calculating a PH value of an optional cell, if the calculation of the PH value corresponds to an actual PUSCH transmission, namely, using an actual transmission format, then the UE sets the V-bit to a predetermined value, such as a bit value of '0'. On the other hand, when calculating the PH using a reference format, wherein, the number of RBs=0, and $\Delta_{TF}$=0, then the UE sets the V-bit to another value, such as a bit value of '1'.

Block 445 corresponds to a PH value and block 455 corresponds to the $P_{CMAX}$ value. Additionally, the PH values of each carrier are provided in a sequential order in blocks 460 to 475. Specifically, according to the present exemplary embodiment, a Type 2 PH value of a PCell is transmitted via block 460 and a corresponding $P_{CMAX}$ is transmitted via block 465, and a Type 1 PH value of a SCell 1 is transmitted in block 470 and a corresponding $P_{CMAX}$ is transmitted in block 475. Additionally, the extended PHR of FIG. 4 includes a PH value and $P_{CMAX}$ for each of the plurality of carriers such that a Type 1 PH value of SCell n is transmitted via block 480 and a corresponding $P_{CMAX}$ is transmitted in block 485. Furthermore block 450 is for an R-bit, which is a reserved bit.

Figure 5:
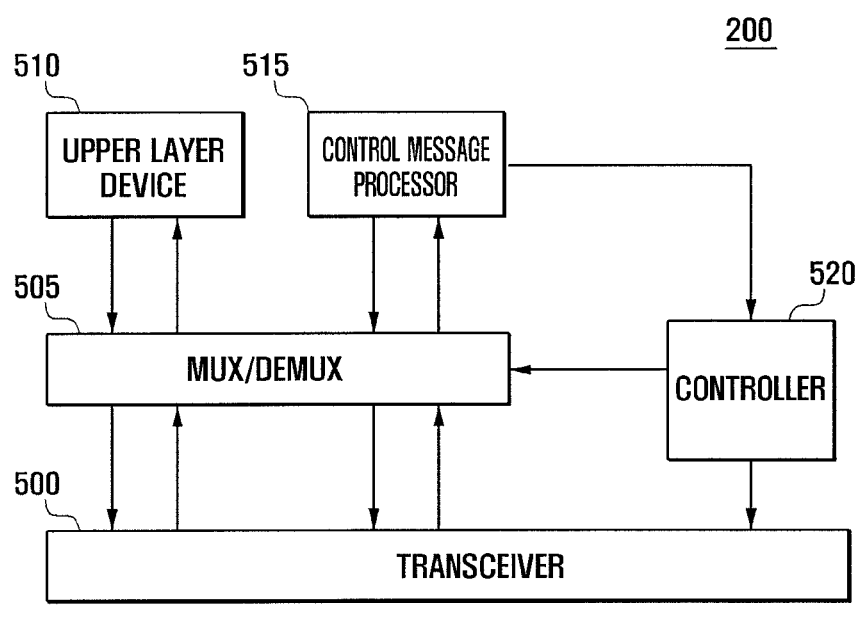
FIG. 5 is a block diagram illustrating a configuration of a PHR transmitting device of a UE according to an exemplary embodiment of the present invention.

FIG. 5 is a block diagram illustrating a configuration of a UE according to an exemplary embodiment of the present invention.

Referring to FIG. 5, a UE 200 includes an upper layer device 510 for transmitting and/or receiving data of an upper layer and a control message processor 515 for transmitting and/or receiving control messages. Furthermore, the UE 200 includes a multiplexer/demultiplexer (MUX/DEMUX) 505 for performing a multiplexing and/or demultiplexing operation when transmitting a control signal or data to the eNB 205, wherein the MUX/DEMUX 505 is operated under the control of a controller 520. The UE 200 also includes a transceiver 500 for transmitting and receiving data.

For example, when receiving data, the UE 200 receives a Radio Frequency (RF) signal via the transceiver 500 under the control of the controller 520, then demultiplexes the received signal using the MUX/DeMUX 505, and then transfers the received demultiplexed signal to the upper layer device 510 or to the control message processor 515 according to message information of the received demultiplexed signal. Thus, according to the exemplary embodiments of the present invention, a BS, such as an eNB, may be notified of a maximum transmission power of a UE and a variation factor corresponding to the maximum transmission power in order in order to enable efficient scheduling.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a user equipment (UE) in a wireless communication system, the method comprising:
   receiving configuration information for configuring a power headroom report (PHR) from a base station, the configuration information indicating whether a PHR format for the UE is an extended PHR;
   identifying whether the PHR format for the UE is the extended PHR based on the configuration information;
   if the PHR format is the extended PHR,
      generating the extended PHR including a maximum transmission power generated based on a power management-maximum power reduction (P-MPR) and an indicator indicating whether the UE applies the P-MPR when determining a lower limit of the maximum transmission power, and
      transmitting the extended PHR to the base station; and
   if the PHR format is not the extended PHR,
      generating a normal PHR without the indicator, and
      transmitting the normal PHR to the base station.

2. The method of claim 1, wherein the configuration information includes information corresponding to a configuration of the extended PHR, the configuration information is received using a Media Access Control-MainConfig Information Element (MAC-MainConfig IE).

3. The method of claim 1,
   wherein the maximum transmission power is determined by the UE according to a first parameter provided from the base station and a second parameter previously set by the UE.

4. The method of claim 1, wherein the indicator is set to 0 if the maximum transmission power is not different from a maximum transmission power not applying the power back-off due to the power management.

5. A user equipment (UE) in a wireless communication system, the UE comprising:
   a controller configured to:
      receive configuration information for configuring a power headroom report (PHR) from a base station (BS), the configuration information indicating whether a PHR format for the UE is an extended PHR,
      identify whether the PHR format for the UE is the extended PHR based on the configuration information,
      if the PHR format is the extended PHR, generate the extended PHR including a maximum transmission power generated based on a power management-maximum power reduction (P-MPR) and an indicator indicating whether the UE applies the P-MPR when determining a lower limit of the maximum transmission power, and transmit the extended PHR to the base station, and if the PHR format is not the extended PHR,
generate a normal PHR without the indicator, and transmit the normal PHR to the base station.

6. The UE of claim 5, wherein the configuration information includes information corresponding to a configuration of the extended PHR, the configuration information transmitted using a Media Access Control-MainConfig Information Element (MAC-MainConfig IE).

7. The UE of claim 5,
wherein the maximum transmission power is determined by the UE according to a first parameter provided from the BS and a second parameter previously set by the UE.

8. The UE of claim 5, wherein the indicator is set to 0 if the maximum transmission power is not different from a maximum transmission power not applying the power back-off due to the power management.

9. A base station in a wireless communication system, the base station comprising:
a controller configured to generate configuration information for configuring a power headroom report (PHR) to a user equipment (UE), the configuration information indicating a PHR format the UE is an extended PHR; and
a transceiver configured to:
transmit the configuration information to the UE, and
receive the PHR corresponding to the PHR format from the UE,
wherein the received PHR is the extended PHR including a maximum transmission power and an indicator indicating whether the UE applies a power management-maximum power reduction (P-MPR) when determining a lower limit of the maximum transmission power, if the PHR format for the UE is the extended PHR,
wherein the received PHR is a normal PHR without the indicator if the PHR format for the UE is not the extended PHR.

10. The base station of claim 9, wherein the configuration information is transmitted using a Media Access Control-MainConfig Information Element (MAC-MainConfig IE).

11. The base station of claim 9,
wherein the maximum transmission power is determined by the UE according to a first parameter provided from the base station and a second parameter previously set by the UE.

12. The base station of claim 9, wherein the indicator is set to 0 if the maximum transmission power is not different from a maximum transmission power not applying the power back-off due to the power management.

13. A method by a base station in a wireless communication system, the method comprising:
generating configuration information for configuring a power headroom report (PHR) to a user equipment (UE), the configuration information indicating a PHR format for the UE is an extended PHR;
transmitting the configuration information to the UE; and
receiving the extended PHR from the UE;
wherein the received PHR is the extended PHR including a maximum transmission power and an indicator indicating whether the UE applies a power management-maximum power reduction (P-MPR) when determining a lower limit of the maximum transmission power, if the PHR format for the UE is the extended PHR,
wherein the received PHR is a normal PHR without the indicator if the PHR format for the UE is not the extended PHR.

14. The method of claim 13, wherein the configuration information is transmitted using a Media Access Control-MainConfig Information Element (MAC-MainConfig IE).

15. The method of claim 13,
wherein the maximum transmission power is determined by the UE according to a first parameter provided from the base station and a second parameter previously set by the UE.

16. The method of claim 13, wherein the indicator is set to 0 if the maximum transmission power is not different from a maximum transmission power not applying the power back-off due to the power management.

* * * * *